United States Patent
Dworkin et al.

(10) Patent No.: US 6,230,179 B1
(45) Date of Patent: May 8, 2001

(54) FINITE FIELD MULTIPLIER WITH INTRINSIC MODULAR REDUCTION

(75) Inventors: James Douglas Dworkin; Michael John Torla, both of Chandler; P. Michael Glaser, Tempe, all of AZ (US); Ashok Vadekar, Mississauga (CA); Robert John Lambert, Hespeler (CA); Scott Alexander Vanstone, Waterloo (CA)

(73) Assignees: Motorola, Inc., Schaumburg, IL (US); Certicom Corp., Ontario (CA)

( * ) Notice: Subject to any disclaimer, the term of this patent is extended or adjusted under 35 U.S.C. 154(b) by 0 days.

(21) Appl. No.: 08/997,960

(22) Filed: Dec. 24, 1997

(51) Int. Cl.[7] ............................................ G06F 7/00

(52) U.S. Cl. ............................................ 708/492

(58) Field of Search .................... 708/491–492, 708/625

(56) References Cited

U.S. PATENT DOCUMENTS

| | | | | |
|---|---|---|---|---|
| 4,216,531 | * | 8/1980 | Chiu ........................................ | 708/625 |
| 5,467,297 | * | 11/1995 | Zook ........................................ | 708/492 |
| 5,612,910 | * | 3/1997 | Meyer ...................................... | 708/492 |
| 5,854,759 | * | 12/1998 | Kaliski, Jr. et al. ................... | 708/492 |
| 5,999,959 | * | 12/1999 | Weng et al. ........................... | 708/492 |
| 6,049,815 | * | 4/2000 | Lambert et al. ...................... | 708/492 |

* cited by examiner

*Primary Examiner*—Tan V. Mai
(74) *Attorney, Agent, or Firm*—Philip P. Macnak

(57) ABSTRACT

A finite field multiplier with intrinsic modular reduction includes an interface unit (1208) that translates an n bit wide data path to a m bit wide data path where n is less than m. Also included is a finite field data unit (1204) with m bit wide registers that is coupled to a finte field control unit (1202). The finite field control unit (1202) includes a microsequencer (1402) and a finite state machine multiplier (1404). The microsequencer (1402) controls the finite state machine multiplier (1404) which performs a finite field multiply operation with intrinsic modular reduction and presents a finite field multiplication product to the finite field data unit (1204).

6 Claims, 11 Drawing Sheets

US 6,230,179 B1

FINITE FIELD MULTIPLIER WITH INTRINSIC MODULAR REDUCTION

FIELD OF THE INVENTION

The present invention relates to a method and apparatus for performing finite field and integer arithmetic.

BACKGROUND OF THE INVENTION

Elliptic Curve(EC) cryptography over a finite field require arithmetic operations of addition, multiplication, squaring and inversion. Additionally, subtraction operations are also required if the field is not of characteristic two. Modular arithmetic operations are also required, for example in computing signatures, however these operations are required less frequently than the finite field operations. EC cryptography as an example, requires the full complement of modular operations, addition, subtraction, multiplication and inversion.

Field sizes for cryptography tend to be relatively large, requiring fast, dedicated processors to perform the arithmetic operations in an acceptable time. Thus there have been numerous implementations of either fast modular arithmetic processor or dedicated processors for performing arithmetic operations in $F_2^m$.

Traditionally RSA was the encryption system of choice, however with the advent of superior and more secure EC cryptography the need for processors that perform modular exponentiation exclusively is becoming less imperative. Thus while users are in transition from RSA cryptography to EC cryptography there is a need for an arithmetic processor that supports both these operations, with little or no penalty in performance.

SUMMARY OF THE INVENTION

It is an object of the invention to provide a processor that combines finite field arithmetic and integer arithmetic and for providing operations required for EC cryptography.

It is a further object of the invention to provide an arithmetic processor design that may be scaled to different field or register sizes.

A still further object of the invention to provide an arithmetic processor that may be used with different field sizes.

A still further object of the invention is to provide an arithmetic processor that is capable of being scaled to provide an increase in speed when performing multi-sequence operations by simultaneously executing multiple steps in the sequence.

In accordance with an embodiment of the invention there is provided an arithmetic processor that performs both finite field arithmetic and integer arithmetic and in which both special purpose registers and general purpose registers, and arithmetic circuits, are shared. For this purpose, a polynomial basis for the finite field hardware will be assumed, since this basis is similar to the standard radix-power basis of the integers.

In accordance with a further embodiment of the invention, there is provided a processor that includes finite field circuitry and integer arithmetic circuitry and which includes general-purpose registers, and special-purpose registers, wherein the special-purpose registers are not shared by the arithmetic circuitry.

In accordance with this invention there is provide an arithmetic processor comprising: finite field arithmetic circuitry; integer arithmetic circuitry; and mode control means for selectively enabling either the finite field circuitry or integer arithmetic circuitry.

BRIEF DESCRIPTION OF THE DRAWINGS

Embodiments of the invention will now be described by way of example only with reference to the accompanying drawings in which.

DESCRIPTION OF A PREFERRED EMBODIMENT

Figure 1:
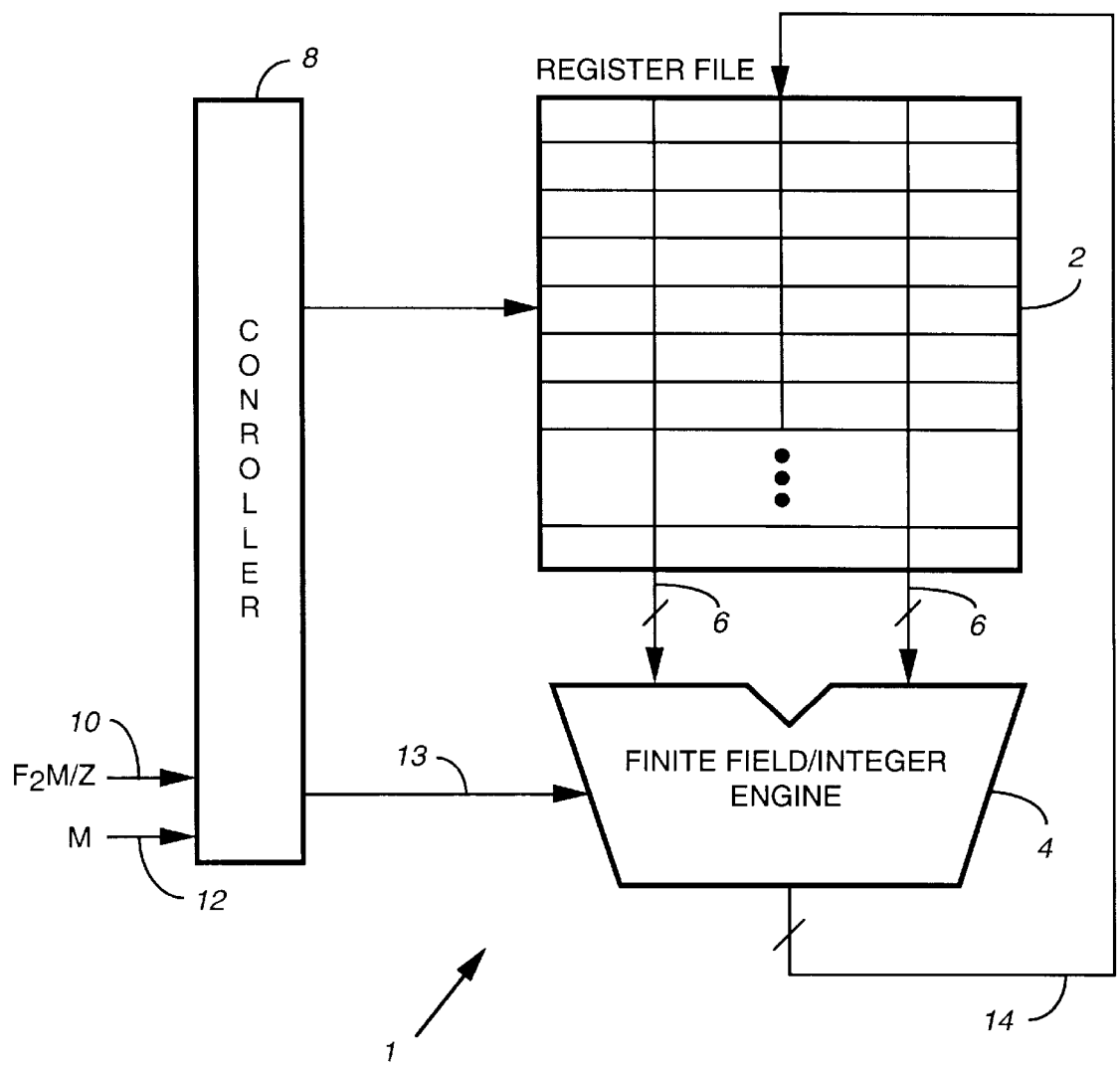
FIG 1 is a block diagram of an arithmetic processor architecture for performing finite field arithmetic and integer arithmetic.

Referring to FIG. 1, an embodiment of an arithmetic processor is shown generally by numeral 1. The arithmetic processor includes a group of general purpose registers 2, termed a register file (which may be used as intermediate storage for EC point additions, point doublings, etc.), which communicate with an arithmetic-logic unit (ALU) 4, via data input buses 6. The ALU 4 includes shared finite field and integer arithmetic circuitry. A data output bus 14 is provided from the ALU 4 to the register file 2 for writing results of computations performed in the ALU 4 to the register file 2. Computational operations of the ALU 4 are controlled via micro-programmed instructions residing in a controller 8 section of the arithmetic processor 1. A mode selection control 10 is provided to select between either finite field computations or modular integer computations. A field size control 12 is also provided for initializing the ALU 4 to accommodate different operand vector sizes. Thus the controller 8 performs the following tasks amongst others: provides the appropriate arithmetic mode and operation to the ALU 4; coordinates data access between the register file 2 and the ALU 4; and provides to the ALU 4 the appropriate field size to be used. The general-purpose registers are chosen to have a width large enough to handle at least the largest foreseeable $F_2^m$ EC cryptosystem. The registers may be combined to support larger lengths required for integer modular arithmetic. For example if a single register in the register file 2 is 512 bits wide, then four registers may be used to provide storage for a single 2048-bit RSA quantity.

Figure 2:
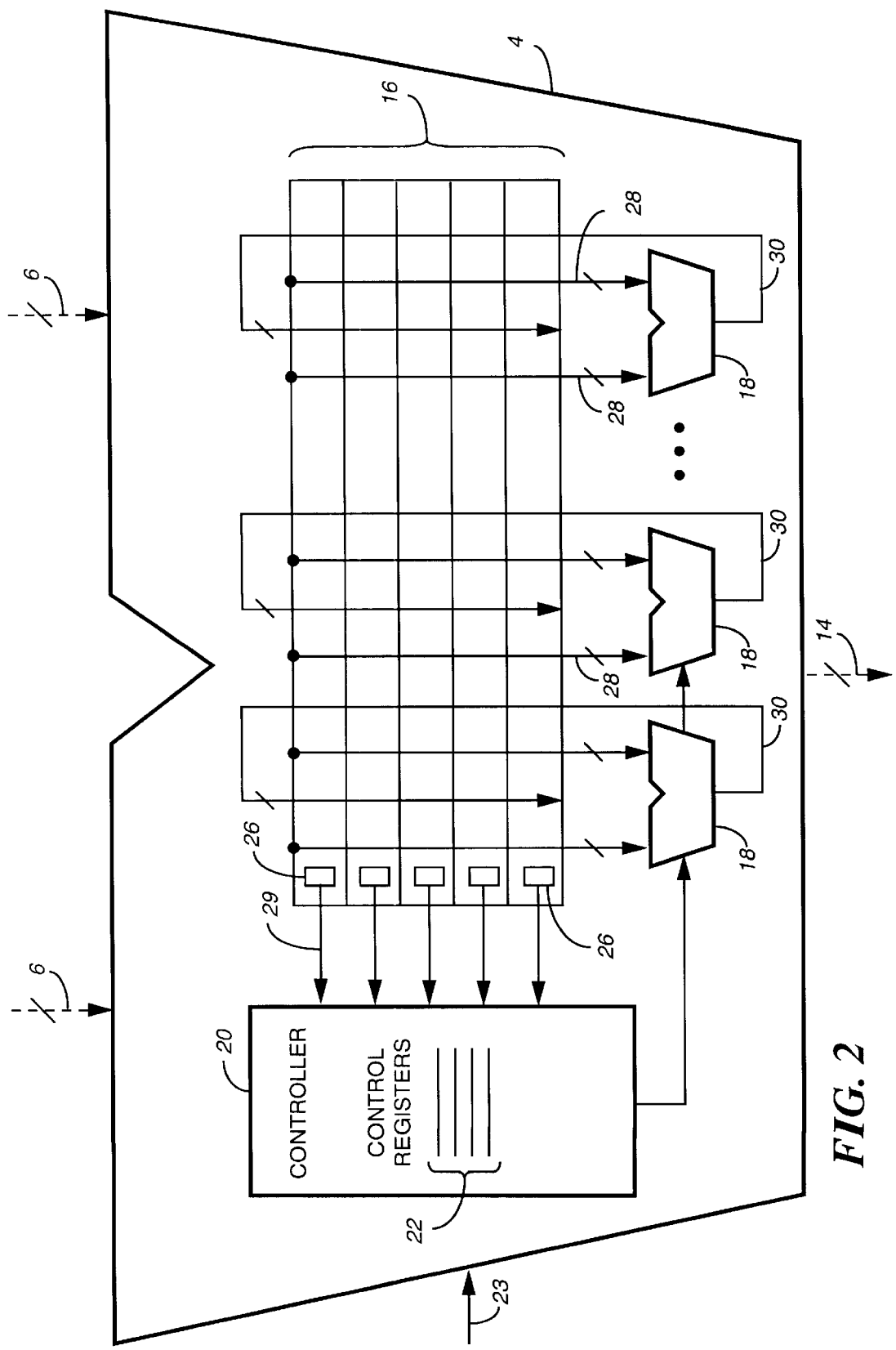
FIG. 2 is a block schematic diagram of the ALU shown in FIG. 1.

Turning now to FIG. 2, the ALU 4 includes several special purpose registers 16, combinatorial logic and arithmetic circuitry contained in a plurality of sub-ALU's 18, input data buses 28 to each of the sub ALU's from the special purpose registers; output data buses 30 to the special purpose registers 16 from the sub ALU's 18 and its own controller 20. The controller 20 performs the following tasks amongst others: sequences the ALU 4 through steps in a computational operation; monitors control bits from the special purpose registers 16; and implements a counter in its own control registers 22 for determining the size of a field being used, a feature which allows the processor 1 to be used for different field sizes without having to redesign the processor hardware. In order to provide these functions, the control bits 26 of the special purpose registers 16 are provided as control bit inputs 24 to the controller 20. The special purpose registers 16 are all individually addressable. The controller 20 also controls data input via the input buses 6 from and to the register file to the sub ALU's 16 or the special purpose registers 16. Each of these components will be described in more detail below.

Figure 3:
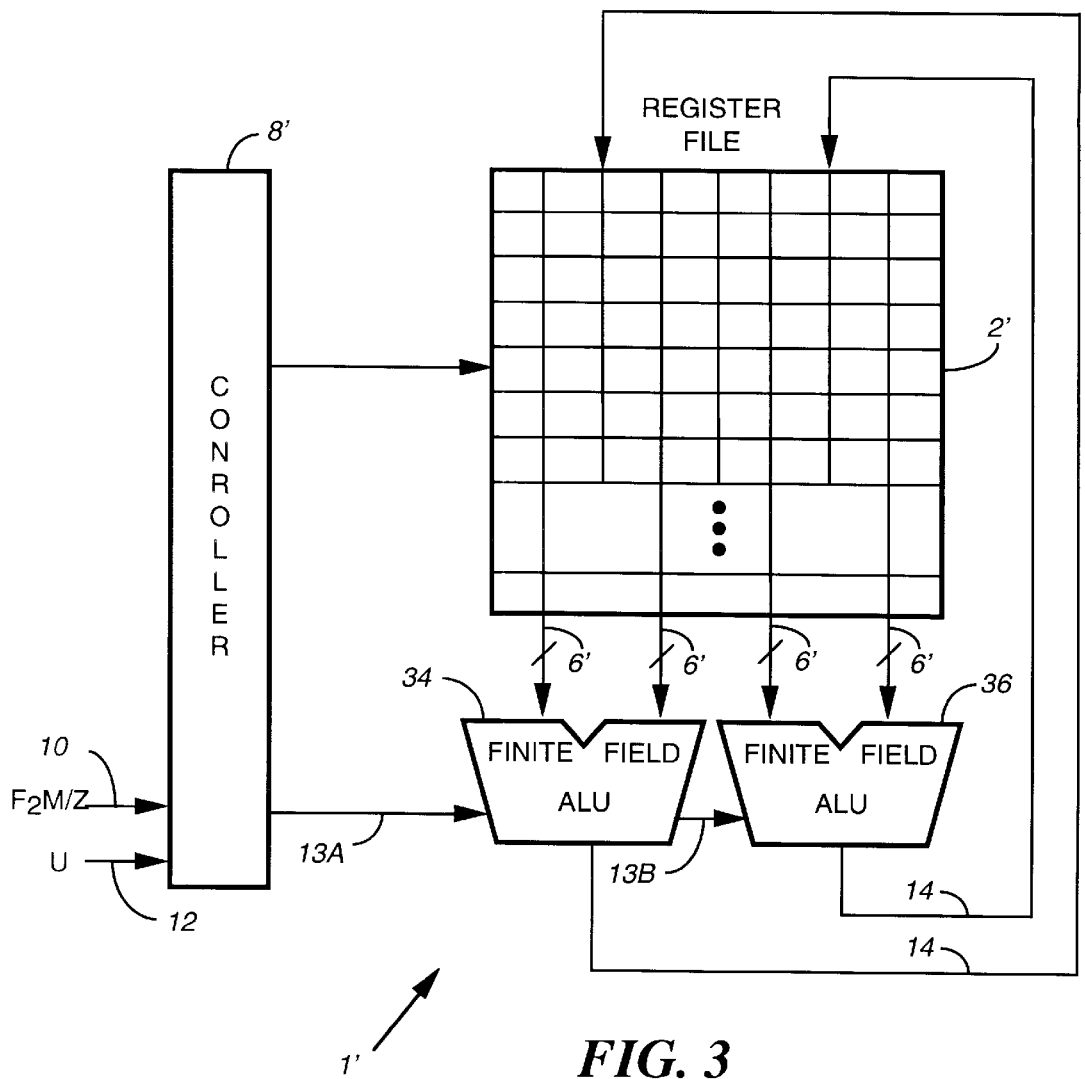
FIG. 3 is a block diagrams of an alternative embodiment of an arithmetic processor architecture for performing finite field arithmetic and integer arithmetic.

Referring to FIG. 3, an alternative embodiment of an arithmetic processor is shown generally by numeral 1'. In this embodiment a separate finite field unit 34 and integer modular arithmetic unit 36 is provided. This processor also includes a register file 2', data input buses 6', data output buses 14', and a controller 8' however separate controls 13a and 13b are provided from the controller 8' to respective ALU's 34 and 36 respectively.

Figure 4:
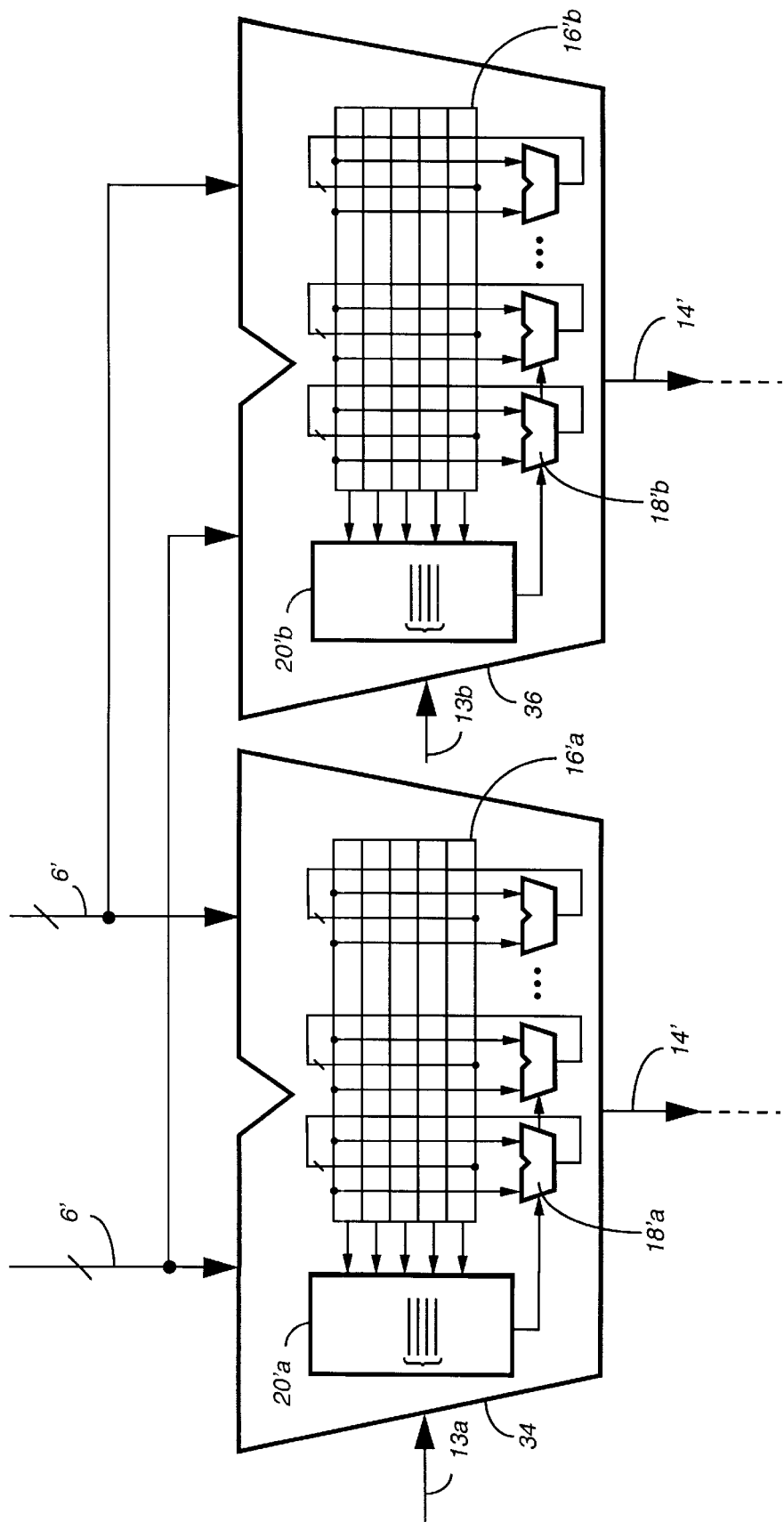
FIG. 4 is a block schematic diagram of the ALU shown in FIG. 3.

Referring to FIG. 4, the ALU's 34 and 36 of FIG. 3 are shown in greater detail. Each of the ALU's 34 and 36 include their own respective special-purpose registers 16'a and 16'b and controller 20'a and 20'b. Each of the ALU's 34 and 36 contain their own sub ALU's 18'a and 18'b respectively. Thus it may be seen that in this embodiment special purpose registers 16'a and 16'b and arithmetic and control circuitry is not shared. One or more of the sub ALU's 18'a perform the functions of Shift left/right, XOR-shift and one or more of the sub ALU's 18'b perform the function of integer add and integer subtract.

Referring back to FIG. 2, the sub ALU's 18 perform the following logical functions on operands provided from the special purpose registers 16: XOR; Shift left/right, XOR-shift, integer add and integer subtract. These functions may be contained in one sub ALU 18 or across multiple sub ALUS. By providing multiple sub ALU's 18 the processor is capable of performing multiple operations, (e.g. for finite field inversion), simultaneously.

Figure 5:
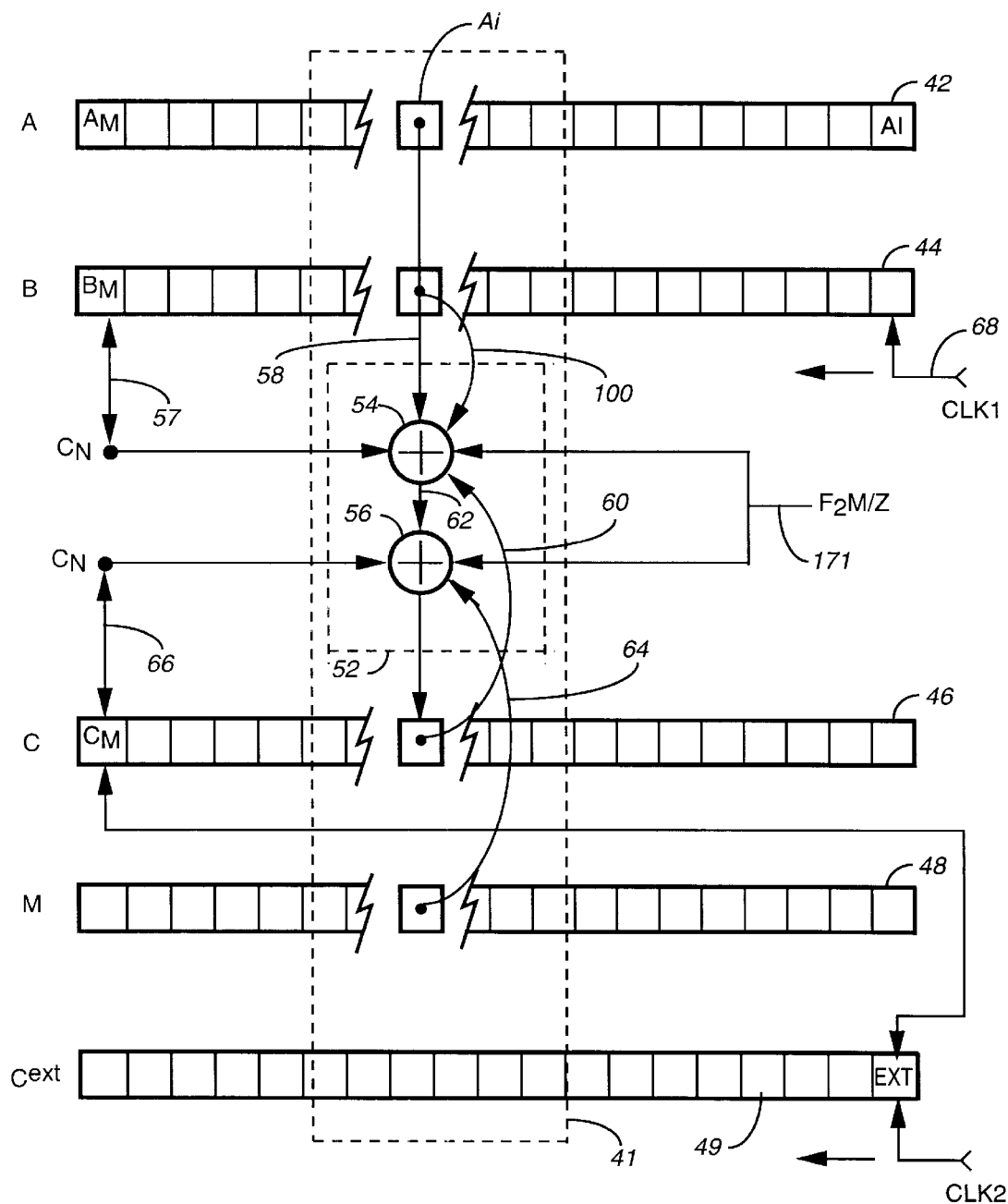
FIG. 5 is a block diagram of an embodiment of a bit-slice of the ALU shown in FIG. 2.

Turning now to FIG. 5, a bit-slice 41 of the ALU 4 shown in FIG. 2 is shown in greater detail. In the following discussion, we shall refer to the interconnection of cells of respective special-purpose registers in conjunction with its associated logic circuitry as a bit-slice 41. The logic circuitry contained in a bit slice is generally represented schematically by one of the sub ALU's 18. It is then intended that the configuration of a bit slice may be repeated M times for an M-bit register. Furthermore, for clarity, we define M to be the number of cells in a register, and we refer to individual cells in a register as, for example, $A_i$ where $1 \leq i \leq M$ and wherein $A_M$ is the right most cell of the special-purpose register. The contents of a register will be referred to by lower case letters, for example, a bit vector of length m will have bits numbered from $a_0 \ldots a_{m-1}$ with $a_0$ being the LSB. It may also be noted that although the special-purpose registers have been given specific names, these registers may take on different functions depending on the arithmetic operation being performed as will be described below.

In FIG. 5, the special-purpose registers 16 include: a pair of operand registers A 42 and B 44, to hold for example the multiplicand and multiplier, respectively, in a multiplication operation; an accumulator register C 46; a modulus register M 48; and a carry extension register $C^{ext}$ 50. The registers each have M cells for holding the respective binary digits of bit vectors loaded therein. It is preferable that these registers are shift registers. A sub ALU 18 shown in FIG. 2 may be implemented by the circuitry of block 52 in FIG. 5, and in a manner to be described below.

Operation of the ALU 4 may be best understood by reference to a specific arithmetic operation such as finite field multiplication. Consider the product C of two elements a and b, where a and b are bit vectors and wherein b will be of the form $b=(b_0, \ldots b_{n-1})$ in polynomial basis representation and a will be of the form $a=(a_0, \ldots a_{n-1})$ in polynomial basis representation. A modulus bit vector m has the form $m=(m_0, \ldots m_n)$. In $F_2^m$, the multiplication may be implemented as a series of steps, which is more clearly set out by the following pseudo-code:

C=0
For i from n−1 to 0 do
   For j from n−1 to 0 do {
   $c_j=c_{j-1}+b_i(a_j)+c_{n-1}(m_j)$
   }
}

In performing the multiplication, partial products of the multiplicand and each of the bits of bi of the multiplier, proceeding from the most significant bit (MSB) to the least significant bit (LSB), are formed. The partial products are reduced by the modulus if the MSB of the previous partial product is set.

Multiplication may be implemented by sequentially using a 1×M multiplier. The modulus register M is loaded with the modulus bit vector M stripped of its most significant bit mn such that each cell contains a respective one of the binary digits mi. In the implementation shown, the bits $m_i$ is arranged from left to right with the MSB of the vector being the leftmost bit, i.e. cell $M_M$ contains bit $M_{n-1}$. The shift registers A and B are loaded with the finite field elements bit vectors a and b respectively so that each cell contains one of the binary digits $a_i$ or $b_i$. The finite field elements a and b are also stored left justified, and in reverse order, in their respective registers so that the topmost bit of the multiplier register b is always available at the left boundary cell bit, i.e. $(a_{n-1}, a_{n-2}, \ldots a_0)$ and $(b_{n-1}, b_{n-2}, \ldots b_0)$. If the length of the vectors a and b are less than the length of the registers; the remaining cells are padded with zeros. The above is generally performed by the controller 20 shown in FIG. 2. Other arrangements of sequential multiplication are possible (such as sequentially reducing the multiplicand), but such arrangements do not allow flexible field sizes along with fixed control bit locations. Bit ordering from LSB to MSB is also possible with corresponding changes in the multiplication algorithm.

A bit-slice 41 of the ALU 4 for implementing multiplication in a finite field is now described. The bit-slice 41 includes first and second controllable adders 54 and 56, respectively, each having an XOR function. The topmost cell $B_M$ of the register B provides an add control signal $b_m$ 57 to the first adder 54. Inputs 58 and 60 to the first adder 54 are derived from a register cell $A_i$ and accumulator cell $C_i$. An output 62 from the first adder 54 is connected to an input of the second adder 56 along with an input 64 from the modulus register cell $M_i$.

The output from the second adder 56 is then connected the accumulator cell $C_i$. A second add control signal 66 is derived from the topmost cell $C_M$ of the accumulator C 46. It may be seen that this signal implements the modular reduction of the partial product in the accumulator C by the modulus vector m, when the topmost bit $C_M$ of C is set. The B register is a clocked shift register. A clock signal CLK1 68, which may be provided by the controller 20 causes the contents of this register to be shifted left for each partial product, calculated.

Figure 6:
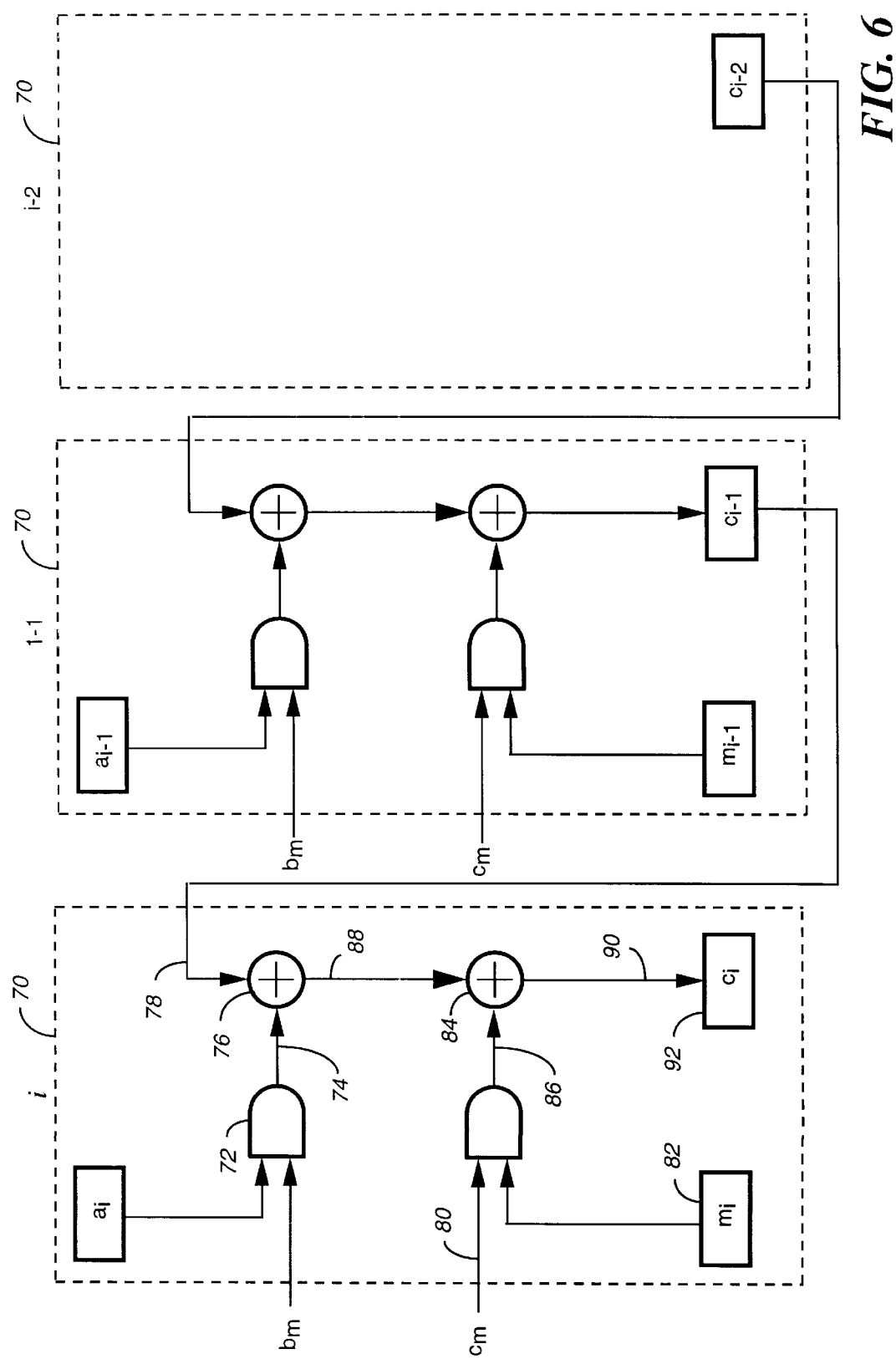
FIG. 6 is a circuit diagram of a finite-field multiplier of the bit-slice shown in FIG. 5.

Referring to FIG. 6, a detailed circuit implementation of the bit-slice 41 of FIG. 5 for finite field multiplication is indicated by numeral 70. Referring to bit-slice i, 70 of FIG. 6, (only three bit-slices are shown for the purpose of illustration in FIG. 6), the cell $a_i$ is ANDed with the add control signal $b_m$ by an AND gate 72. The output 74 of the AND gate 72 is connected to an input of an XOR gate 76 along with an input 78 from adjacent cell $C_{i-1}$ of the accumulator C. Thus implementing the calculation of the term "$c_{j-1}+b_i(a_i)$." The term "$c_{n-1}(m_j)$" is implemented by ANDing the signal $c_n$ 80 with $m_i$ 82 utilizing an AND gate 84. The output 86 of the AND gate 84 is connected to the input of an XOR gate 84, along with the output 88 of XOR gate 76. The output 90 of XOR gate 84 is connected to cell $C_i$ 92. Thus implementing the expression "$c_j=c_{j-1}+b_i(a_j)+c_{n-1}(m_j)$." With this general sequential multiplier, the product of two n-bit finite field elements will be produced in n clock cycles. It is preferable that a synchronous counter, that may be contained in the controller 20, provides control of the number of iterations.

Addition

Although the circuitry has been described with reference to multiplication in a finite field $F_2^m$, other computational operations may also be performed with ease. Finite field addition has an advantage over integer arithmetic in that no carries are produced. The computation of a finite field sum requires only that an XOR gate be introduced at each cell of the registers in question since addition of two elements a and b in a finite field is simply a EXOR b. Thus, referring back to FIG. 5, an input 100 is provided to the first adder 54 from cell $B_i$, and the second adder 56 may be bypassed. The output from adder 54 is then written directly into cell $C_i$. After the operands have been moved into registers a and b, the addition can be performed in a single clock cycle. It is also possible for the operation to be performed in the ALU and the result written back into a general register in the register file.

Squaring

Squaring a number can be performed in the same time as multiplication of two different numbers. Squaring in a polynomial basis can be performed in a single clock cycle, if the specific irreducible along with the squaring expansion is explicitly hardwired Inversion Inversion of finite field elements in $F_2^m$ may be performed using the extended Euclidean algorithm and utilizing four of the special purpose registers with additional control logic. This will be completed in 2n cycles if the shifting is made concurrently to the adds (which is easily implemented by hard wiring the outputs of the add to the next register cell).

Figure 7:
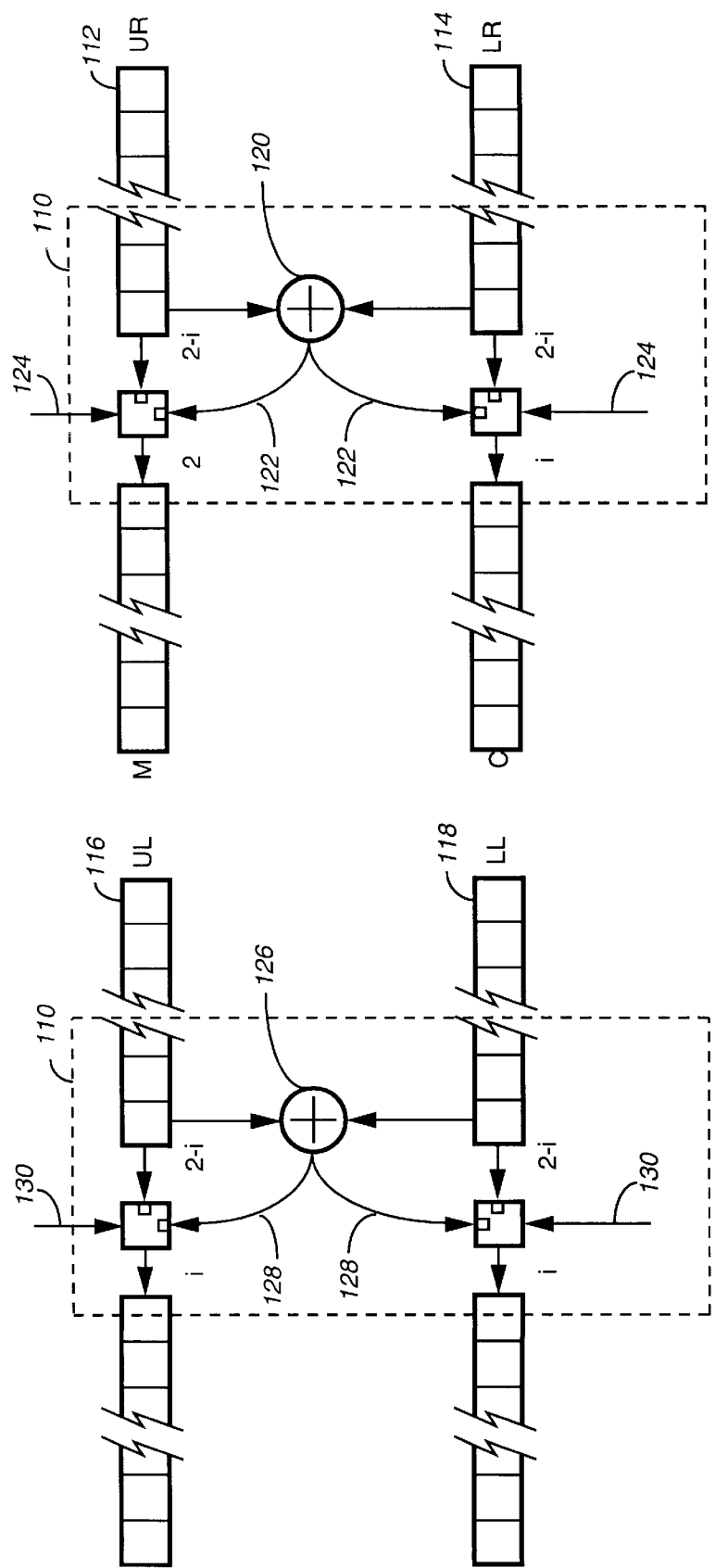
FIG. 7 is a block diagram of an arithmetic inverter.

The registers used in the inversion are A, B, M and C. For convenience these registers are schematically shown in FIG. 7 wherein they are assigned the following labels: A:UL; B:LL; M:UR; and C:LR. Once again the operation may be described with reference to a bit-slice 110.

The operands in an inversion are generally: an element to invert g; an irreducible polynomial for modulus m; a bit vector "0" and a bit vector "1." The UL register 116 is loaded with f or m. The LL register 118 is loaded with g, the UR register 112 is loaded with "0" and the LR register 114 is loaded with "1." For the UR and LR registers 112 and 114, respectively, cells $UR_i$ and $LR_i$ are XORed together by XOR gate 120 to produce an output 122. A control signal 124 determines whether one of three possible inputs is written in cell $UR_i$ and $UL_i$. The inputs are either a left or right shift from adjacent cells or the output 122. The control signal B determined by the state table to be described below. For the UL or LL registers 116 and 118, respectively, cells $UL_I$ and $LL_I$ are XORed together by XOR gate 126 to produce an output 128. A control signal 130 determines whether one of two possible inputs is written into cell $UL_i$ and $LL_i$. The inputs are either a left shift from the adjacent cell (i−1) or the output 128. Once again the control signal 130 is determined by the state table to be described below.

If we assume the control variables to be $k_u$–the length of the U registers and $k_l$–the length of the L registers. Then $\Delta=k_u-k_l$. The values $k_l$ and $k_u$ are implemented with synchronous countdown counters, and $\Delta$ is implemented with a synchronous up/down counter. Counter registers $k_u$, $k_l$ and $\Delta$ are also provided. The UL and LL registers are left shift registers while the UR and LR registers are both left and right shift registers.

Furthermore, for the count registers, $\Delta$ is loaded with 0, $K_u$ is initialized to M. A control bit latch provides a toggle function wherein a "1" designates an up count and a "0" designates a down count. The U/D control is initially set to "1." Then a sequencer contained in the controller for performing the inversion in the ALU has the following outputs:

deckl . . . Decrement $K_l$ decku . . . Decrement $K_u$ deDelta . . . Decrement $\Delta$ incDelta . . . Increment $\Delta$ toggle . . . Toggle UP/DOWN lsUL . . . left-shift Upper Left register lsLL . . . left-shift Lower Left register lsUR . . . left-shift Upper Right register lsLR . . . left-shift Lower Right register rsUR . . . right-shift Upper Right register rsLR . . . right-shift Lower Right register outLR . . . Output Lower Right register outUR . . . Output Upper Right register dadd-lsLL . . . Down XOR and left-shift Lower Left register uadd-lsUL . . . Up XOR and left-shift Upper Left register A state table outlining the action of the inverter follows as TABLE 1, wherein $M_u$ and $M_l$ are the upper bit of registers UL and LL respectively and wherein $M_u$ and $M_l$ determine the current state. When an action is performed on the registers and counters which places the inverter in a new state. The process is repeated until either $K_u$ or $K_l$ are zero and one of the right register RL or RU will contain $g^{-1}$.

TABLE 1

| U/D | $K_u$ | $K_l$ | $\Delta$ | $M_u$ | $M_l$ | Action |
|---|---|---|---|---|---|---|
| X | 0 | X | X | X | X | OutLR |
| X | X | 0 | X | X | X | OutUR |
| 1 | $\bar{0}$ | $\bar{0}$ | 0 | 0 | 1 | Deck$_u$ dec $\Delta$ lsUL lsURtoggle |
| 1 | $\bar{0}$ | $\bar{0}$ | $\bar{0}$ | 0 | 1 | Deck$_u$ dec $\Delta$ lsUL rsLR |
| 0 | $\bar{0}$ | $\bar{0}$ | X | 0 | 1 | Deck$_u$ dec $\Delta$ lsUL lsUR |

TABLE 1-continued

| U/D | $K_u$ | $K_l$ | Δ | $M_u$ | $M_l$ | Action |
|---|---|---|---|---|---|---|
| 0 | $\bar{0}$ | $\bar{0}$ | 0 | 1 | 0 | $Deck_l$ inc Δ lsLL lsLR toggle |
| 0 | $\bar{0}$ | $\bar{0}$ | $\bar{0}$ | 1 | 0 | $Deck_l$ inc Δ lsLL rsUR |
| 1 | $\bar{0}$ | $\bar{0}$ | X | 1 | 0 | $Deck_l$ inc Δ lsLL lsLR |
| 0 | $\bar{0}$ | $\bar{0}$ | 0 | 1 | 1 | $Deck_l$ inc Δ Dadd-lsLL lsLR toggle |
| 0 | $\bar{0}$ | $\bar{0}$ | $\bar{0}$ | 1 | 1 | $Deck_l$ inc Δ Dadd-lsLL rsUR |
| 1 | $\bar{0}$ | $\bar{0}$ | 0 | 1 | 1 | $Deck_u$ dec Δ Uadd-lsUL lsUR toggle |
| 1 | $\bar{0}$ | $\bar{0}$ | $\bar{0}$ | 1 | 1 | $Deck_u$ dec Δ Uadd-lsUL rsLR |

Integer arithmetic

The extreme similarity of polynomial and integer representations for allows for the sharing of hardware in the ALU. For addition, the integer arithmetic is only complicated by the requirement for carries. The integer arithmetic operations of the ALU are best illustrated by way of example utilizing a multiplication operation.

Multiplication in Z is illustrated by way of reference to the following sequence of steps represented in pseudo-code, wherein as earlier, a and b are bit vectors to be multiplied and c is the product of a and b, and wherein $c=(c_0, c_1, \ldots c_{n-1})$.

C=0
M=0
For i from 0 to n−1 do
 $C^{ext} \leftarrow C$
 For j from 0 to n−1 do
  $c_j=(b_i(a_j)+m_j+c_j) \bmod 2$
  $m_j+1=(b_i(a_j)+m_j+c_j)/2$
And where
 $C^{ext} \leftarrow C$: For j from n−1 to 0 do
  $c_{j-1}=c_j$
  $c_{j-1}^{ext}=c_j^{ext}$ It may be observed that the bit-slices 70 for finite field multiplication illustrated in the embodiment of FIG. 6, may be modified to include multiplication for integer representations. It may also be noted that for integer multiplication, the registers are loaded with the bit vectors in reverse order i.e. the leftmost cell of a register contains the LSB of the bit vector. In integer number multiplication, it is necessary to implement carries between successive partial products, furthermore as the partial products are not being reduced by a modulus the carries from the addition of successive partial products must be provided for. Thus the accumulator register C is extended and a new register $C^{ext}$ 49 is provided as shown in FIG. 5. Before each partial product is formed, the lowest bit of the accumulator C (cell $C_M$) is shifted into the topmost bit of the extension register $C^{ext}$ (cell $C^{ext}_{-1}$) and then both the accumulator C and $C^{ext}$ are shifted toward the LSB by one bit. The final result is obtained in C and $C^{ext}$, wherein $C^{ext}$ contains the low order bits of the product. This is represented by the operation $C^{ext} \leftarrow C$ above.

Figure 8:
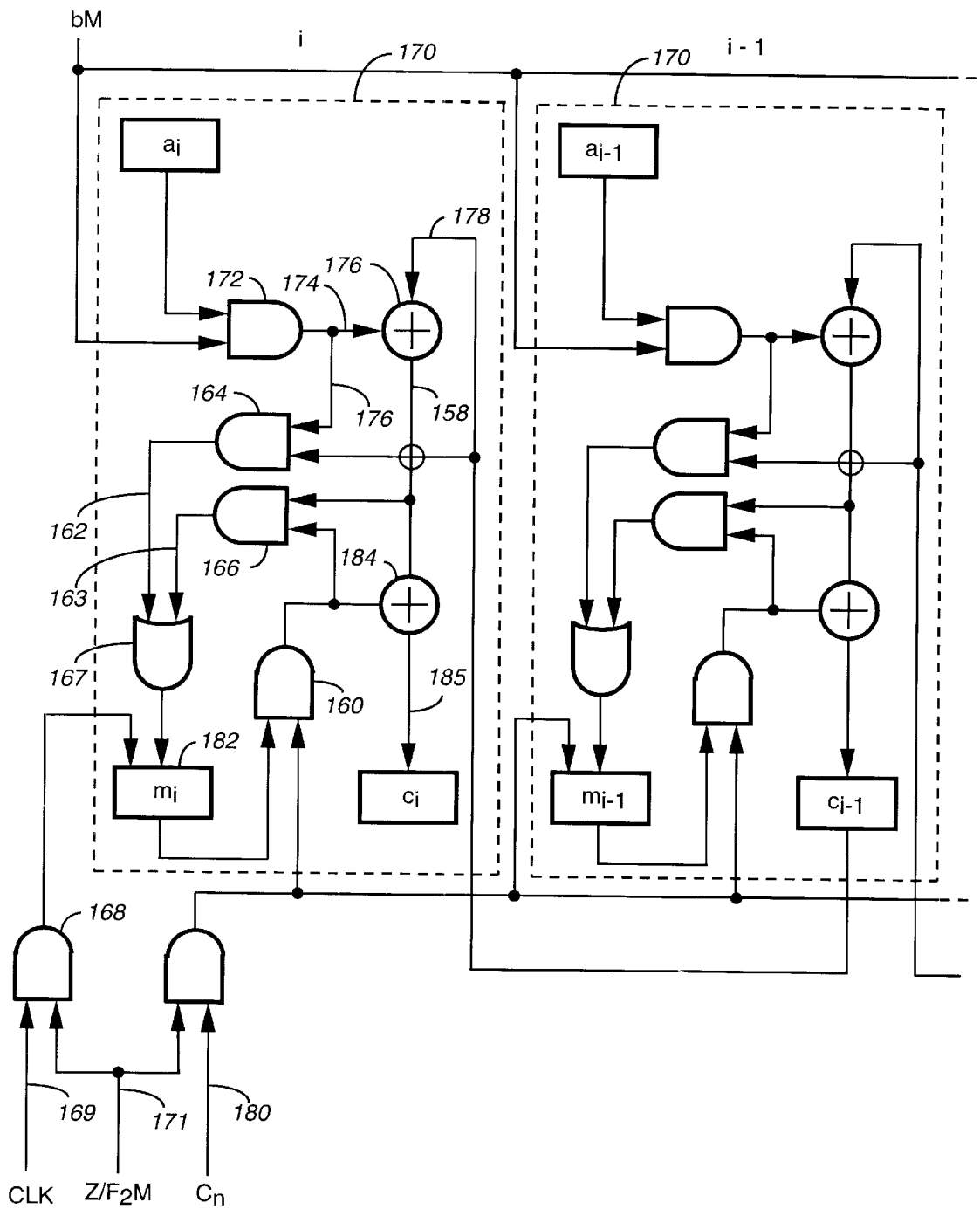
FIG. 8 is a circuit diagram of a combined finite-field/integer multiplier.

Referring now to FIG. 8, a bit-slice 170 is shown, and which is similar to the bit-slice 70 of FIG. 6. Accordingly the reference numerals used in the description of FIG. 6 will be used to identify like components with a prefix 100 added i.e. reference numeral 70 will become 170. The arrangement of FIG. 8 differs from FIG. 6 in two important ways; the modulus register m is used as a carry register, and a mode selection signal $Z/F_2^M$ 171 is provided.

Now the terms $c_j=c_{j-1}+b_i(a_i)+c_{n-1}(m_j)$ are implemented as before for the finite field multiplication with the product of the control signal $b_m$ and the contents of register cell $A_i$, implemented by AND gate 172. The output 174 of the AND gate 172 is XORed with the contents of register cell $c_{j-1}$ by XOR gate 176 to produce an output term $c_{j-1}+b_i(a_i)$ indicated by numeral 158. This output signal is XORed using XOR gate 184 with the term "$c_{n-1}(m_j)$" indicated by numeral 185, derived from the AND gate 160 to produce the term $c_j$. In addition, a carry term $m_j$ is produced from the sum of the respective products "$b_i(a_i) \cdot c_{j-1}$" 162 and "$(c_{j-1}+b_i(a_i)) \cdot (m_j)$" 163 and written into cell $m_j$ 182. The product terms 162 and 163 are implemented by AND gates 164 and 166 respectively. The sum of the terms 162 and 163 are implemented by OR gate 167.

The mode selection signal $Z/F_2^M$ 171, is ORed with the carry input signal $c_n$ 180 and is also ANDed 168 with clock signal 169. Thus by setting $Z/F_2^M=0$, will implement finite field arithmetic and by setting $Z/F_2^M=1$ will implement integer arithmetic.

Thus the modifications necessary to convert the finite field multiplier given previously in FIG. 6 into a combined finite field/integer multiplier are shown in FIG. 8. Note that the output register C is extended to collect the low order bits of the multiplication. As computations in Z are performed without a modulus, the modulus register M is not used to reduce the partial products but as a holder of the carries. The control signal $Z/F_2^M$ 171 enables the integer multiplication circuitry for the ALU.

A final carry propagation may be provided by a Manchester ripple chain, possibly extended by a carry-skip mechanism of one or two layers owing to the long register length. It is also possible to clock for n more cycles, allowing the carry save adders to completely merge the carries.

Two's complement subtraction can be implemented in the carry propagation adder provided that one input can be conditionally complemented at its input and that a "hot" carry-in is made at the LSB of the adder.

When multiplying, the ripple-carry will be intolerable even if improved by the carry-skip, but this carry propagation can be almost entirely removed by using a carry-save adder, which provides a redundant representation of the partial product, which is only resolved after the multiplication is complete.

Figure 9:
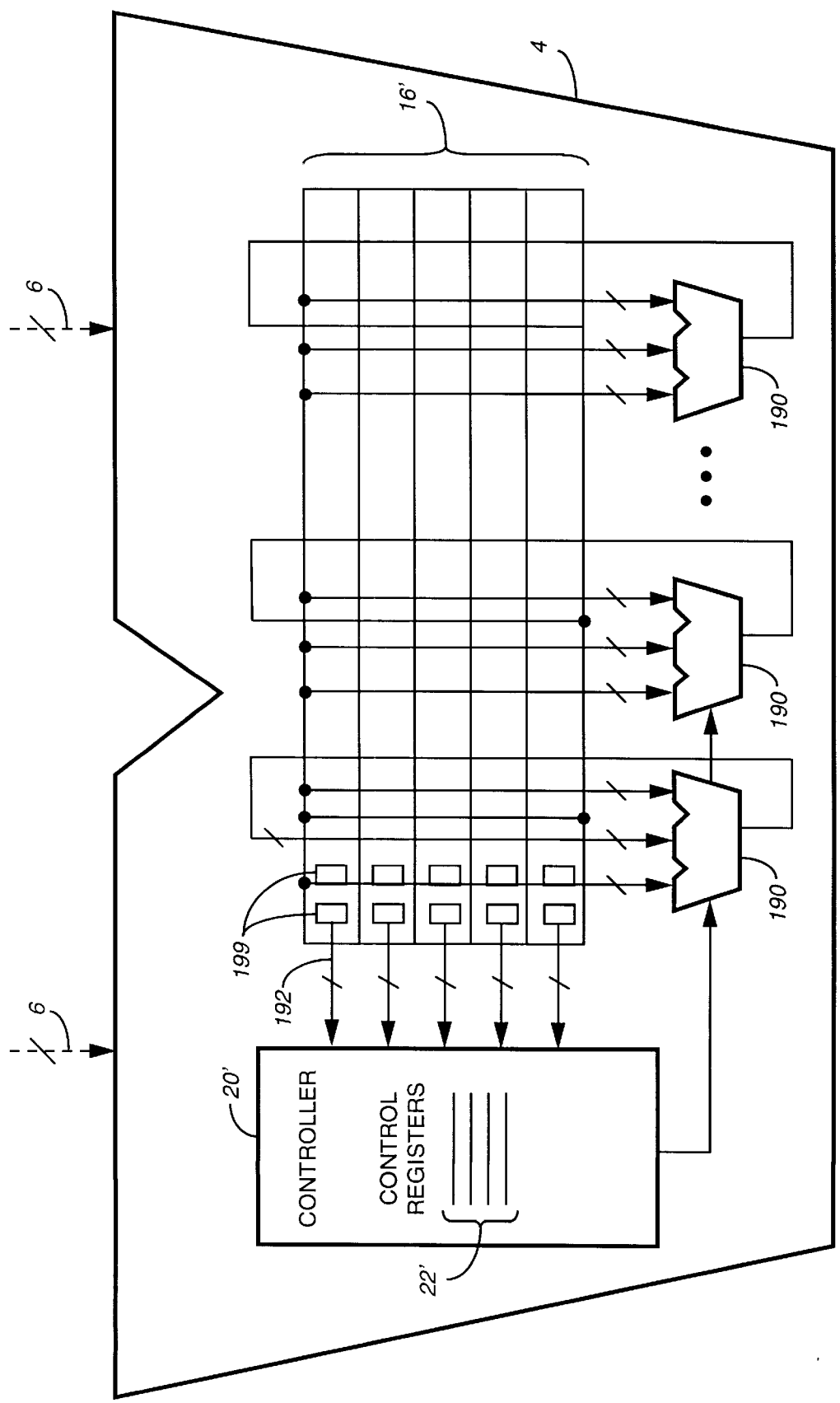
FIG. 9 is a block schematic diagram showing an embodiment of a multi-bit ALU of FIG. 1.

In a further embodiment the ALU 4 may be modified to provide a linear increase in computation speed as shown in FIG. 9. This is achieved by processing consecutive bits from the special-purpose registers 16' at once, and implementing additional circuitry indicated by the modified sub ALU's 190 to process the incremental additions as schematically illustrated in FIG. 9. Processing multiple bits then results in a linear increase in speed. For example, where a computation is performed sequentially two or more steps in the sequence may be performed simultaneously. In this case the controller 20' will process two or more control bits 194 from the special-purpose registers 16', and the inputs 192 to the controller are indicated in FIG. 9 as multi-bit lines.

Figure 10:
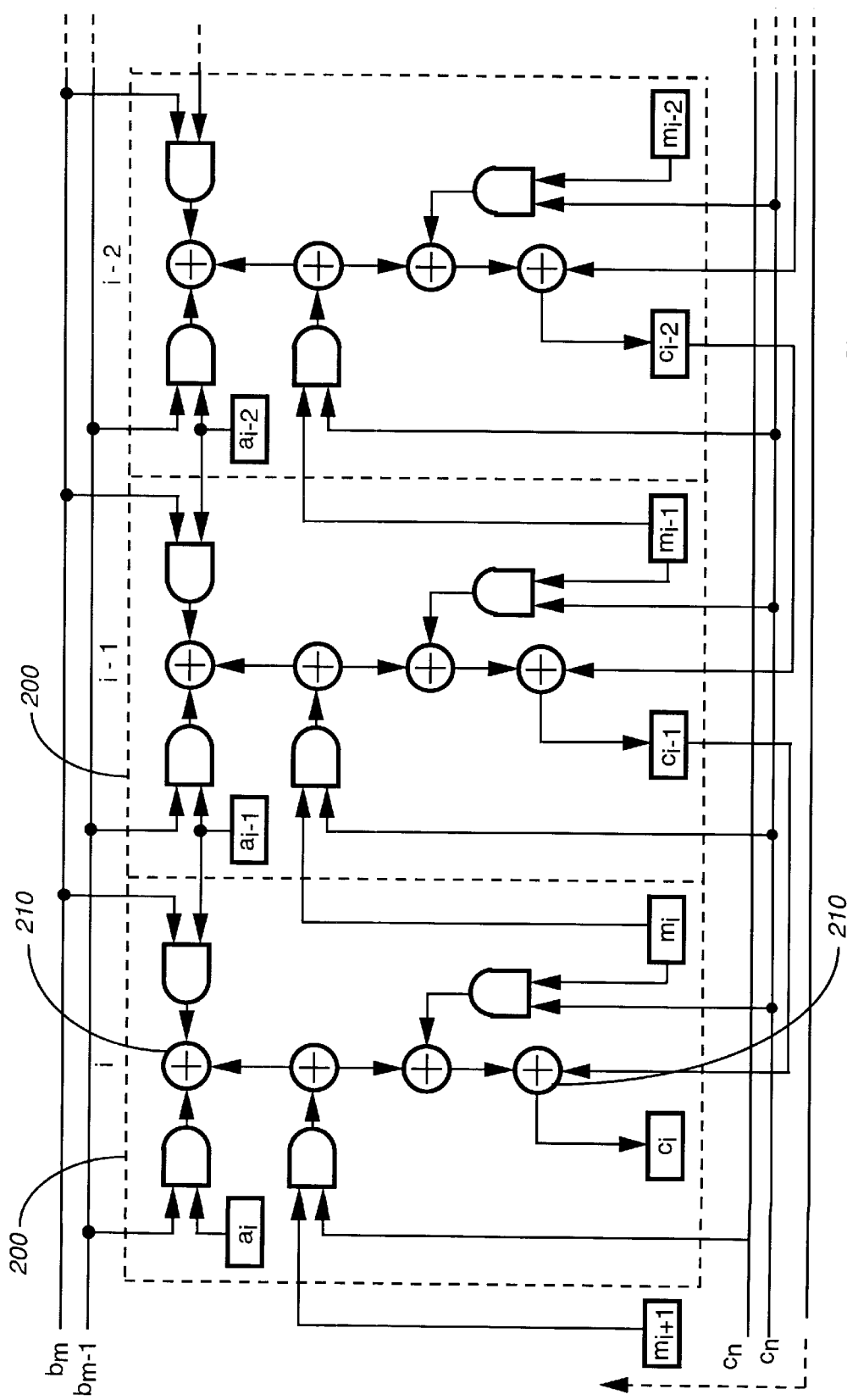
FIG. 10 is a circuit diagram of the multi-bit finite-field multiplier of FIG. 9.

A circuit diagram of a two-bit at a time multiplier for finite fields is shown in FIG. 10. In this implementation, the bit-slices 200 have twice the number of XOR gates 210, implementing two terms of the addition, the circuit takes two bits of multipliers and adds in two adjacent shifts of the multicand $a_i$ and $a_{i-1}$, and reduces with two adjacent shifts of the modulus $M_i$ and $M_{i-1}$. This has the effect of simultaneously producing two consecutive partial products with modulus reduction, thus halving the total computation time.

It should also be noted that the top-bits of the special-purpose registers are used as control bits for the controllers 20' or 20. This has the advantage that when the operands are loaded into the registers, they are aligned left; thus control is always obtained from a fixed bit location. However, other bits may be used as a control bits, e.g. the bottom bits; however, this may additionally increase the complexity of the hardware.

Again, multi-bit operation potentially providing improved linear increase in computation speed, since such options as Booth (or modified-Booth) recoding become possible.

It is assumed that the ALU will also be able to perform simple arithmetic operations on general registers. An alternative is to have all arithmetic performed on ALU internal registers, with the general-purpose registers able only to read and write these registers.

The functionality of the ALU will include integer addition, utilizing some carry propagation method, such as a ripple carry or the combination of carry skip addition and carry completion.

The ALU will also provide simple XOR functionality for use in finite field addition. Since the integer and finite field representations (bit orders) are reversed, it is beneficial to provide a bit reversal mechanism for use in field to integer and integer to field conversions. The tops of two shift registers are connected to provide for this facility in n clock cycles, where n is the length of the arithmetic operands.

The general architecture given here has the potential not only to share the register file between EC and modular exponential arithmetic, but also to share special purpose registers and even combinational logic, in addition to shared control registers.

More particularly, the invention is embodied as a circuit and method for multiplying two finite field elements over the field $F(2^m)$. A finite field that contains $2^m$ elements is conveniently represented in a binary element containing m bits. A finite field element is any collection of m bits, where each bit can be either 0 or 1. The m bits of the finite field element can represent any of a number of things, depending on the specific implementation of the system. Two possible examples are integers and polynomials.

An integer represented in binary is a representation well known in the art. Much like the base 10 (decimal) system, integers are represented in base 2 (binary) as well. For example, the decimal number 12 is represented in binary as the string of bits "1100". The least significant bit holds the 1's place. The next bit holds the 2's place. The next bits hold the 4's and 8's place, respectively. This particular finite field contains 4 bits, thus the field contains a maximum of $2^4=16$ elements. It is commonly understood that a 4-bit binary integer can range from 0 to 15. A mathematical way to represent this exemplary finite field is shown below.

$$12=1100=1*(8)+1*(4)+0*(2)+0*(1)$$

$$=1*(2^3)+1*(2^2)+0*(2^1)+0*(2^0)$$

A collection of m bits can also represent a polynomial, where the bits are the ordered set of coefficients of the polynomial. For example, the 3-bit polynomial $(x^2+1)$ can be represented by (101). Since the finite field element is a collection of binary bits (called "characteristic 2"), the coefficients of the polynomial must be 0 or 1. Mathematical functions like addition and multiplication are defined over polynomials just as they are for integers. Addition of two polynomials is very easy, especially if the coefficients are limited to the values 0 and 1. In the example shown below, all coefficients are reduced modulo 2, since the finite field has characteristic 2.

First, consider the following polynomials:

$$(x^2+x+0)+(0+x+1)=(x^2+2x+1)=(x^2+0x+1)=(x^2+1)$$

These polynomials may be represented in binary fields as follows:

$$(1\ 1\ 0)+(0\ 1\ 1)=(1\ 2\ 1)=(1\ 0\ 1)=(x^2+1)$$

Notice that the result of (A+B)=(A XOR B). Thus, addition of polynomials in characteristic 2 is equivalent to a bitwise XOR.

If the finite field is characteristic 2, subtraction is also done using XOR. This result derives from the fact that coefficients are reduced modulo 2.

Multiplication is more complex, but has a regular structure that can be exploited in hardware. This is described in more detail below.

Multiplication within a finite field must be a "closed" operation, otherwise it would no longer be a finite field. Take for example multiplying the two 3-bit polynomials shown above. This creates an $x^3$ term, which has no representation in our exemplary 3-bit system.

$$(x^2+x+0)*(0x+1)=(x^3+2x^2+x)\ !!!\ \text{CANNOT REPRESENT}\ !!!$$

To solve this problem, the results are reduced modulo another polynomial. This other polynomial is commonly called the "irreducible polynomial," and is analogous to the modulus in ordinary integer arithmetic. The number 12 is represented by (1100) in binary integers, and if 12 is multiplied by 3, the result is 36, which is too large to represent with 4 bits. The result, 36, can be reduced modulo 16. So, 36% 16 is equal to 4. Therefore (1100)*(0011)= (0100), modulo 16. In this case, 16 is the modulus.

The problem that this invention solves is the computing of A*B mod M, where A and B are binary polynomials, and M is another binary polynomial called the "irreducible polynomial."

A naive approach would be to brute force multiply A by B, store it into a wide register, then perform the reduction. This would result in extremely large register sizes, yielding an impractical implementation. However, the invention performs built-in modular reduction by M during the multiplication. The wide register from the impractical example would require 2m bits, if A and B are both m bits wide. The invention performs the multiplication and reduction with no extra bits required for an intermediate result, and no loss of precision which is unacceptable when dealing with symmetric coding systems.

The novel multiplier takes bits of B, one at a time, and multiplies it by all bits of A. This is analogous to creating a partial product in ordinary integer multiplication. The current partial product is then added to a 1-bit shifted version of the previous partial product. Then, if the current partial product (accumulator) has a 1 in its most significant bit, the entire M value is subtracted from the partial product (this is the reduction step). After subtraction, the partial product is guaranteed to be less than the irreducible polynomial. As note before, subtraction in characteristic 2 is equivalent to addition, which is an XOR function. The basic algorithm described can be represented by the following pseudo-code:

C=0 m="field size in bits"

for (i=m−1 downto 0)

for m=m−1 downto 0)

C(j)=(((B(i)*A(j))+C(j−1))+(C(m)*M(j)))

Note that the * is a 1-bit binary multiplication, equivalent to an AND function, and the + is a 1-bit binary addition, equivalent to an XOR function.

Figure 11:
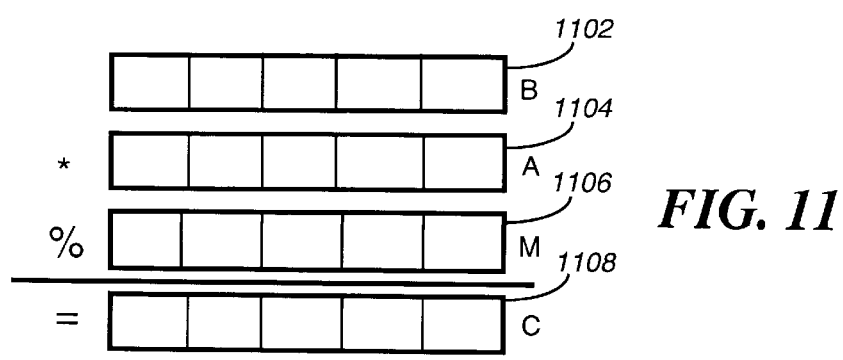
FIG. 11 is a structure of a circuit that performs finite field multiplication.

Referring to FIG. 11, the illustration shows a structure of a circuit that performs finite field multiplication as described in the preceding text.

In this example, assume that each register 1102, 1104, 1106, 1108 contains m bits. All registers are capable of left-shifting. Also, each bit of the registers communicates with its neighboring bits, e.g., in each cell (bit-slice), a single bit of A, M, and C are stored. The ith bit of A is ANDed with the most significant bit of B, and then added to the (i−1)th bit of C. This is equivalent to multiplying all of A by 1 bit of B and accumulating with a shifted version of C. Then, the ith bit of M is conditionally subtracted from this intermediate result if the most significant (nth) bit of C is a 1. Note again that subtraction equals addition in characteristic 2, thus the subtractor is simply an XOR gate. The most significant bit of C indicates whether a reduction by M must occur.

This circuit has considerable flexibility. The registers A, B, M, and C are each 256 bits wide. Thus, multiplications of up to 256 bits are supported. However, the circuit is flexible enough to handle multiplications less than 256 bits, in increments of 1. As long as the data is written left-aligned into the registers, with the most significant bit occupying the leftmost position, and zero-padded to the right, this circuit will efficiently compute the finite field multiplication.

Finite field multiplication is critical to the elliptic curve cryptosystem. It is the lowest-level non-trivial function that must be computed, therefore improvements to the art such as this invention have a direct, noticeable impact on system performance.

Figure 12:
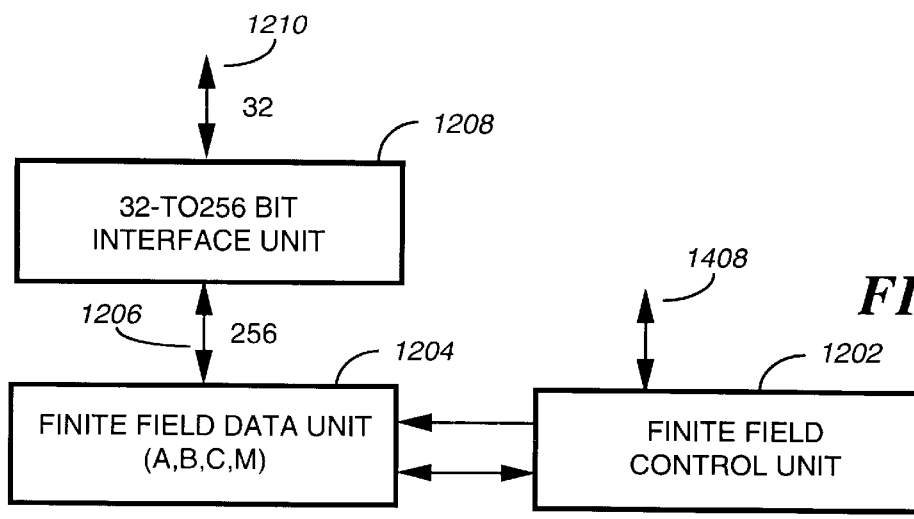
FIG. 12 is a block diagram of a finite field data unit, a finite field control unit, and an interface unit.

Referring to FIG. 12, the block diagram shows a finite field data unit 1204, a finite field control unit 1202, and an interface unit 1208.

The finite field data unit 1204 contains the 4 registers. The finite field control unit 1202 contains a state machine, and the interface unit 1208 is preferably a 256-bit register that preferably translates a narrow 32-bit interface to a 256-bit parallel interface for the finite field data unit 1204. Data can be read and written from the registers through the interface unit 1208. When the registers are written and properly aligned, the finite field control unit 1202 is instructed to "GO", causing the multiplication to proceed until finished. Basically, each bit of B is tested, starting with the MSB, and the operands are shifted, until the full multiplication is complete.

Figure 13:
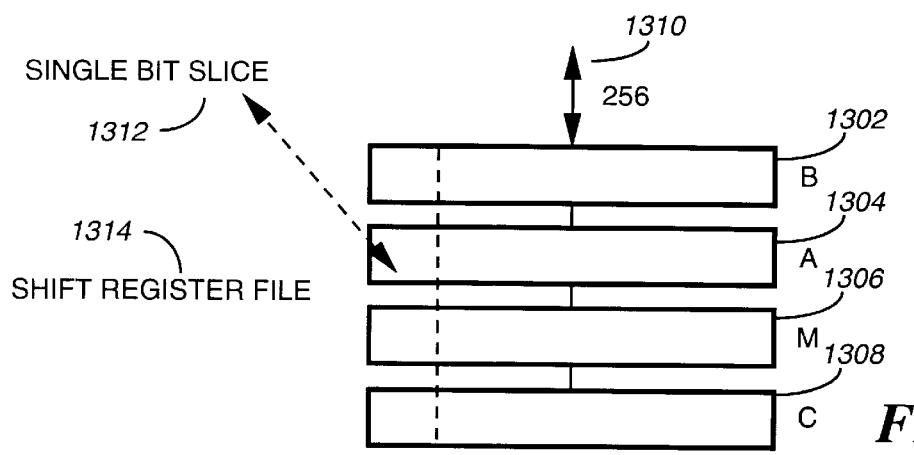
FIG. 13 is a structure of the finite field data unit.

Referring to FIG. 13, the illustration shows a structure of the finite field data unit 1204. The 4 registers 1302, 1304, 1306, 1308 in this finite field data unit 1204 correspond with the registers 1102, 1104, 1106, 1108 illustrated in FIG. 11. This more detailed representation shows a 256 bit data path 1310 and the single bit slice 1312 as part of a shift register file 1314.

Figure 14:
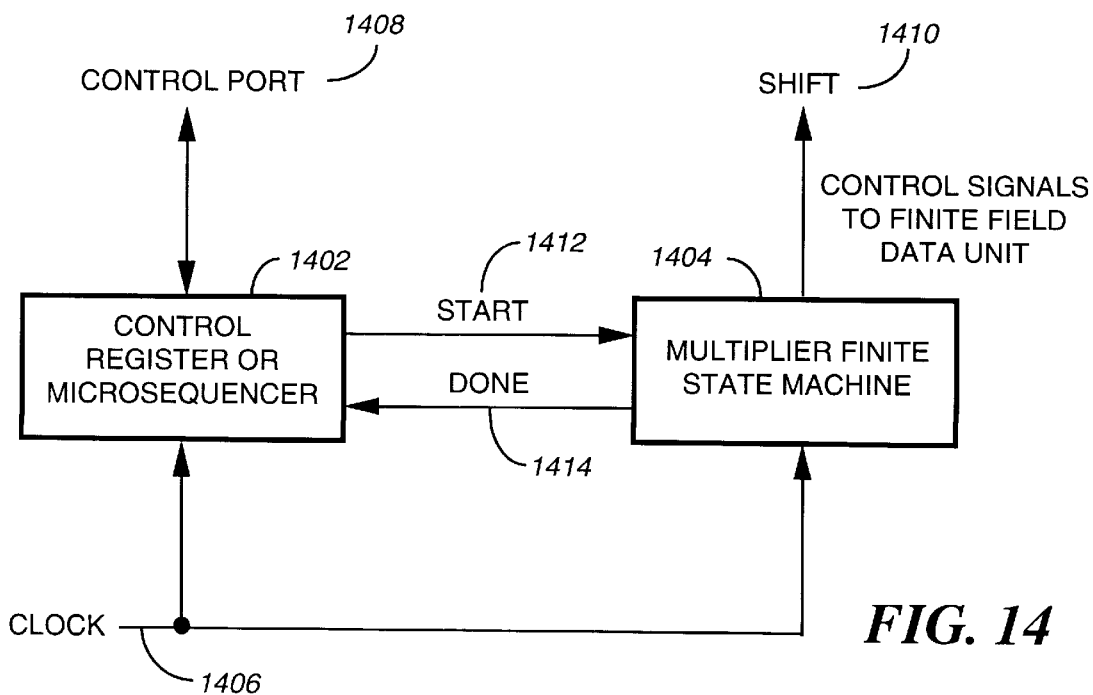
FIG. 14 is a block diagram of the finite field control unit.

Referring to FIG. 14, the illustration shows a block diagram of the finite field control unit 1202.

The control port 1408 exists so that the user can initiate a multiplication. Upon initiation, the control register 1402 or microsequencer is instructed to perform a multiply operation. A start signal 1412 is issued to a finite state machine 1404, which outputs the control signals 1410 for the finite field data unit. Once per cycle, the registers 1302, 1304, 1306, 1308 are shifted to the left (LSB to MSB), and new data is computed/latched into the C register. When all bits of B have been used, the multiplication is complete, and the done signal 1414 is asserted by the state machine, at which time the process stops.

Details relating to the control register or microsequencer are omitted, as they are conventional element that are well known in the art.

While the invention has been described in connection with a specific embodiment thereof and in a specific use, various modifications thereof will occur to those skilled in the art without departing from the spirit of the invention. For example it may be noted that in the embodiments described, reference is made to specific logic circuits, however equivalent circuits may be used, for example by using de Morgans Rule or if inverted logic is implemented then complementary circuits may be used. In addition, when referring to the orientation of the registers and bit vectors, i.e., left, right, top, bottom, other arrangements of these directions are also implied.

The terms and expressions which have been employed in the specification are used as terms of description and not of limitations, there is no intention in the use of such terms and expressions to exclude any equivalents of the features shown and described or portions thereof, but it is recognized that various modifications are possible within the scope of the invention.

We claim:

1. A finite field multiplier with intrinsic modular reduction, comprising:
   an interface unit that translates an n bit wide data path to a m bit wide data path where n is less than m;
   a finite field data unit coupled to the interface unit, the finite field data unit comprising m bit wide registers coupled to an arithmetic logic unit; and
   a finite field control unit coupled to the finite field data unit, the finite field control unit comprising
   a microsequencer, and
   a finite state machine for controlling the finite field multipliers
   the microsequencer having a control port that accepts a signal requesting a finite field multiplication, and upon receiving the signal requesting a finite field multiplication, the microsequencer sends a start signal to the finite state machine which performs a finite field multiply operation and upon completion of the finite field multiply operation, the finite state machine sends a done signal to the microsequencer indicating completion of the finite field multiply operation, the finite state machine further coupling a finite field multiplication product to the finite field data unit.

2. The finite field multiplier according to claim 1 wherein m is 256 and n is 32.

3. The finite field multiplier according to claim 1 wherein the finite field data unit comprises four m bit wide registers coupled to the interface unit and to the finite field control unit.

4. The finite field multiplier according to claim 3 wherein the four m bit wide registers are shift registers designated as B, A, M, and C, where B is a multiplier register, A is a multiplicand register, M is a modulo factor register, and C is a product register, which are used to provide a finite field multiplication when coupled to the arithmetic logic unit (ALU for performing multiplying. adding. and subtracting. with the finite state machine operating to multiply B by A by repeating the following procedure m times:
   a current finite field partial product is formed by multiplying each bit of B, one at a time, by all bits of A;
   the current finite field partial product is added to a 1-bit shifted version of a previous finite field partial product, if any, to form an accumulated finite field partial product which is stored in C; and
   when a most significant bit of the accumulated finite field partial product is 1, a modulo factor in M is subtracted from the accumulated finite field partial product stored in C to insure that the finite field multiplication product remains less than an irreducible value.

5. The finite field multiplier according to claim 4 wherein the 1-bit shifted version of a previous finite field partial product is formed by left shifting the previous finite field partial product 1-bit.

6. In a finite field multiplier having four m bit wide shift registers designated as B, A, M, and C, where B is a multiplier register, A is a multiplicand register, M is a modulo factor register, and C is a product register, which are used to provide a finite field multiplication when coupled to an arithmetic logic unit (ALU) for performing multiplying, adding, and subtracting, a method for computing a finite field product with intrinsic modular reduction comprising the steps of:

forming a current finite field partial product by multiplying each bit of B, one at a time, by all bits of A;

adding the current finite field partial product to a 1-bit shifted version of a previous finite field partial product, if any, to form an accumulated finite field partial product which is stored in C;

when a most significant bit of the accumulated finite field partial product stored in C is 1, subtracting a modulo factor in M from the accumulated finite field partial product to insure that the finite field multiplication product remains less than an irreducible value; and repeating the forming and adding steps, and if necessary, the subtracting step, m times to complete the finite field multiplication.

\* \* \* \* \*